United States Patent [19]
Morita et al.

[11] Patent Number: 5,721,022
[45] Date of Patent: Feb. 24, 1998

[54] DISPOSABLE PAN

[75] Inventors: Chirio Morita; Kenichi Ito; Yoshiyuki Daido, all of Hyogo; Yoshinori Tokunaga; Seiji Ohtomo, both of Osaka; Takatomo Funamoto, Shizuoka; Kaoru Matsui, Osaka, all of Japan

[73] Assignees: Niitaka Kagaku Chemical Industry Co., Ltd.; Honshu Electrical Materials Sales Co., Ltd., both of Osaka; Oji Paper Co., Ltd., Tokyo, all of Japan

[21] Appl. No.: 450,933

[22] Filed: May 25, 1995

[30] Foreign Application Priority Data

Aug. 22, 1994 [JP] Japan ................... 6-011515 U

[51] Int. Cl.$^6$ .................................... B65D 65/22
[52] U.S. Cl. .................. 428/34.2; 428/34.3; 428/130; 428/498; 428/920; 426/113; 426/523; 229/3.5 R; 229/87.03; 229/406
[58] Field of Search .................... 426/113, 126, 426/523; 99/422, 426; 229/3.5 MF, 87.03, 406, 3.5 R; 383/120, 116; 428/34.2, 35.6, 35.8, 35.9, 464, 511, 537.5, 920, 921, 34.3, 130, 498

[56] References Cited

U.S. PATENT DOCUMENTS

| | | | |
|---|---|---|---|
| 2,027,296 | 1/1936 | Stuart | 449/406 |
| 2,170,040 | 8/1939 | Stuart | 426/113 |
| 2,355,559 | 8/1944 | Renner | 229/406 |
| 2,832,522 | 4/1958 | Schlanger | 229/406 |
| 2,951,765 | 9/1960 | Robson | 426/113 |
| 3,656,991 | 4/1972 | Blackwell et al. | 117/33.3 |
| 4,026,284 | 5/1977 | Morris et al. | 229/406 |
| 5,264,284 | 11/1993 | Miyata | 428/921 |

FOREIGN PATENT DOCUMENTS

| | | | |
|---|---|---|---|
| 60-12491 | 4/1985 | Japan | |
| 60-155420 | 10/1985 | Japan | |
| 62-182134 | 11/1987 | Japan | |
| 64-47329 | 3/1989 | Japan | |
| 112676 | 4/1989 | Japan | |
| 121631 | 6/1989 | Japan | |
| 1153129 | 10/1989 | Japan | |
| 1153130 | 10/1989 | Japan | |
| 1153131 | 10/1989 | Japan | |
| 3043-066 | 2/1991 | Japan | 426/113 |

*Primary Examiner*—Rena Dye
*Attorney, Agent, or Firm*—Griffin, Butler, Whisenhunt & Kurtossy

[57] ABSTRACT

Two types of disposable pans made from a paper sheet material by press means are disclosed, particularly designed to prevent its paper configuration from easily deforming and/or to prevent its bottom portion from easy burning or scorching. The one type includes at least two parts, a bowl-like concave part having a bottom portion and an opening divergent part extended upwards from said concave parts. This type necessitates a specific supporting means when used with a cooking oven. The another type additionally includes a flange part interposed between said two parts and can be used without any supporting means. In order to prevent the paper configuration from easy deforming, a plurality of folds are provided on the opening divergent part to have the overlapped width small, and/or a synthetic resin is laminated on said paper sheet material. In order to prevent the bottom portion from easily burning, the inner upper surface of said bottom portion is provided with one or plural projections, a metallic foil or sheet is laminated on the outer back surface of said bottom portion, and/or the paper sheet material is impregnated with a surface active agent or the like.

30 Claims, 7 Drawing Sheets

DISPOSABLE PAN

FIELD OF THE INVENTION

The present invention relates to a disposable pan made from a paper sheet material by press means, adaptable for a cooking oven using solid or liquid fuel composed principally of alcohol, particularly designed to prevent its paper configuration from easily deforming and its bottom portion from easily burning.

BACKGROUND OF THE INVENTION

A disposable pan 26 made from aluminum foil sheet by press means as shown in FIG. 4 is known and provided with a peripheral folding edge 28, an opening divergent wall portion 29 extended upwards from said edge, a bottom portion 27 and an upper peripheral edge 31.

This type of a disposable pan necessitates a specific means when adapted for a cooking oven. This means is such as a supporting frame 32 as shown in FIG. 5, including an upper and lower bars 34, 33, a connection bar 35 and a plurality of hooks 36, the one end of which is connected with the lower loop bar 33 and the other end is hung above the upper peripheral edge 41b of a cooking oven 50. 56 is a solid fuel.

Another type of a disposable pan made from aluminum foil sheet by press means as shownin FIG. 3 is also known by Japanese utility model application laid-open publication No.41323/92 where a pan 40 is provided with a bowl-like concave part 42 including a bottom portion, an opening upper divergent part 46, and a flange part 44 interposed between said two parts. Since the flange part 44 can be supported directly upon the opening edge of the cooking oven 50, this type does not necessitate any supporting means 32, as shown in FIG. 5, profitably saves money and is easy in handling.

However, the disposable pan of any type as aforesaid presents some problems about after-treatment or waste. So far as the used material is in general aluminum, aluminum waste can not be sorted with flammable waste, as paper waste and must be collected as metal waste where cooking soup and residues are brought in together. Complaints are heard about this collection, and so such cooking soup and residues must be separately collected with much trouble.

SUMMARY OF THE INVENTION

An object of the present invention is to provide a disposable pan made from a paper sheet material by press means, which can be after-treated together with cooking soup and residues as flammable waste after use, and designed to prevent its paper configuration from easily deforming and/or to prevent its bottom portion from easily burning or scorching.

According to the present invention, a disposable pan made from a paper sheet material by press means comprises a bowl-like concave part including a bottom portion, a flange part extended outwards from the upper peripheral edge of said concave part, and an opening divergent part extended upwards from the outer peripheral folding edge of said flange part, designed to prevent its paper configuration from easily deforming and/or its bottom portion from easily burning or scorching.

According to the present invention, another disposable pan made from a paper sheet material by press means comprises a bowl-like concave part including a bottom portion, and an opening divergent part extended upwards from said concave part, designed to prevent its paper configuration from easily deforming and/or its bottom portion from easily burning or scorching.

In order to prevent the paper configuration from easily deforming, according to the present invention, a plurality of folds are provided on the opening divergent part to have the overlapped width small, and/or a synthetic resin is laminated on at least the upper surface of the upper and lower surfaces of said paper sheet material.

In order to prevent the bottom portion from easy burning or scorching, according to the present invention, the inner upper surface of said bottom portion is provided with one or plural projections, a metallic foil or sheet is laminated on the outer back surface of said bottom portion, and/or the paper sheet material is impregnated with a surface active agent or the like.

Preferred embodiments of the present invention are hereinafter described with reference to the accompanying drawings.

DETAILED DESCRIPTION OF THE INVENTION

Figure 1:
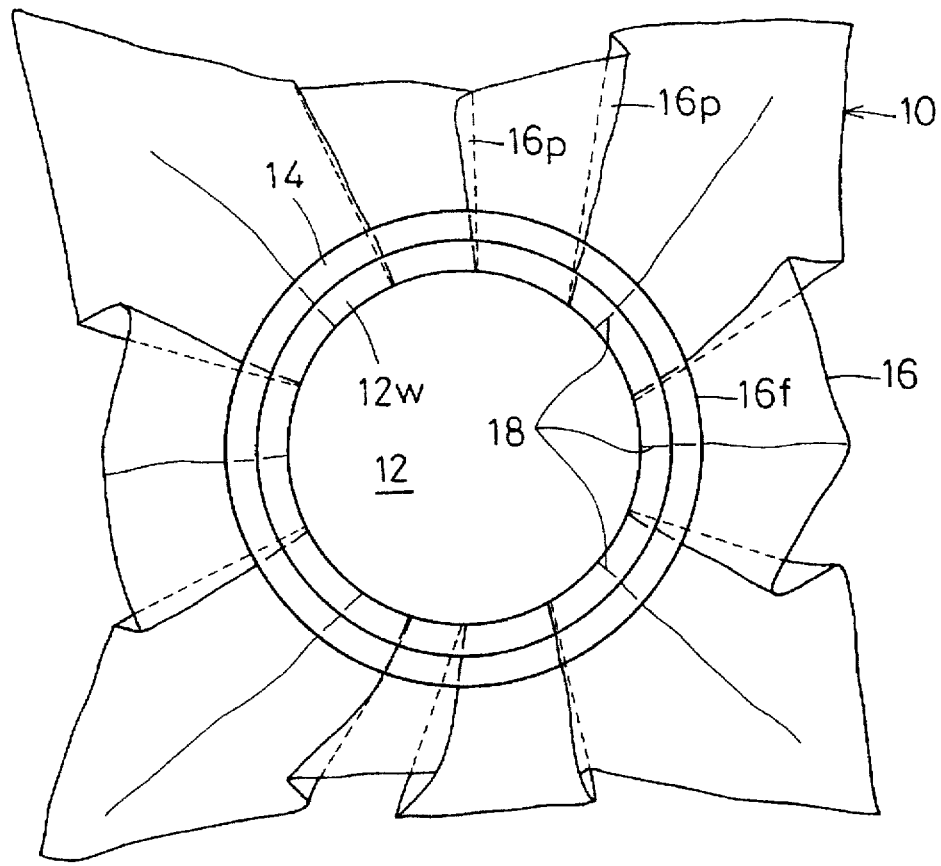
FIG. 1 is a top view showing an embodiment of the present invention.
Figure 2:
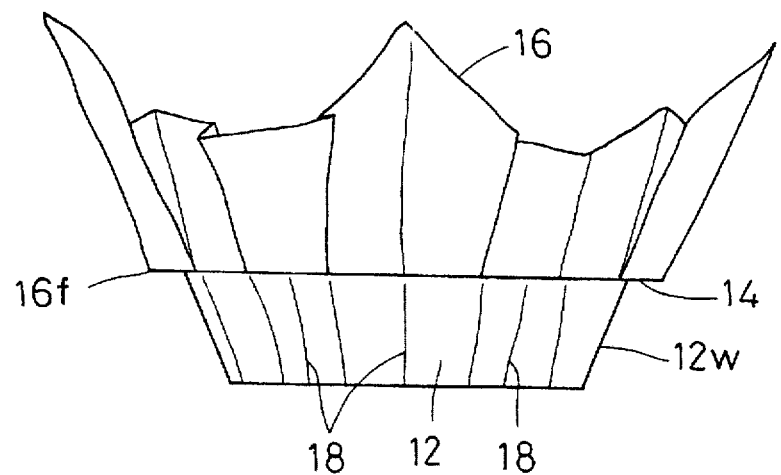
FIG. 2 is a side view showing another embodiment of the present invention.
Figure 3:
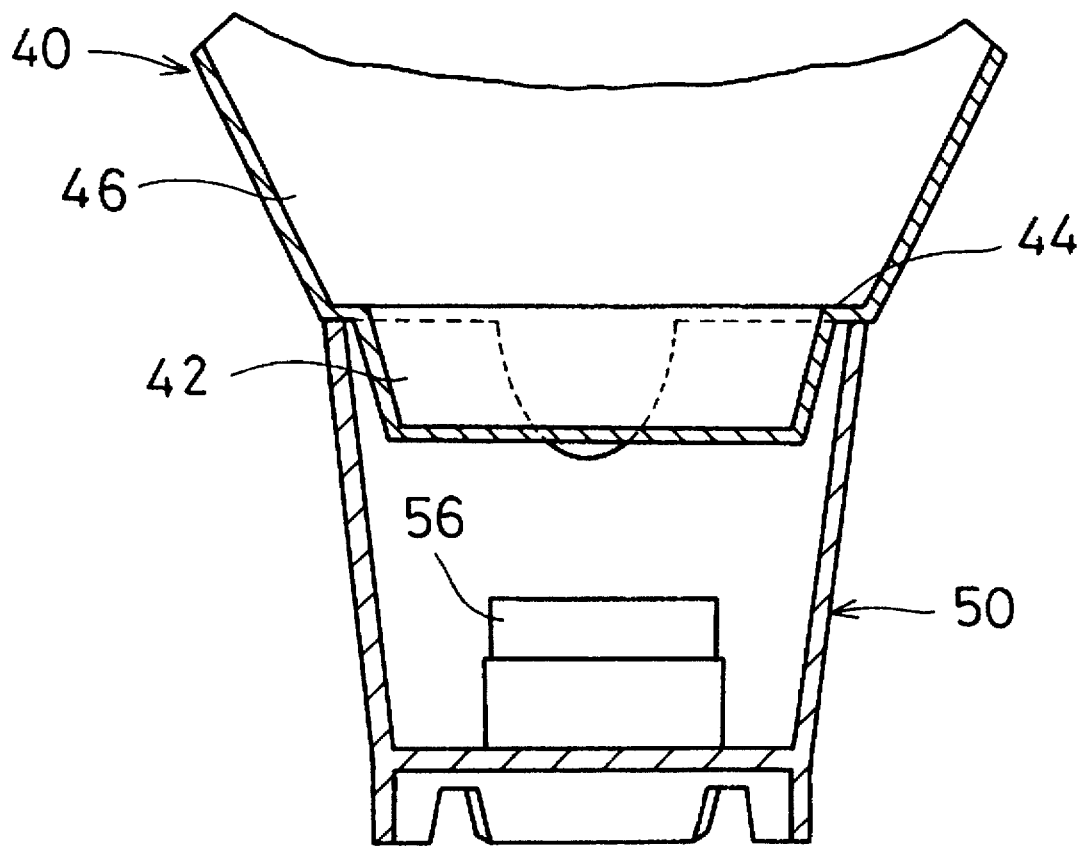
FIG. 3 is a section side view showing a prior art pan.
Figure 4:
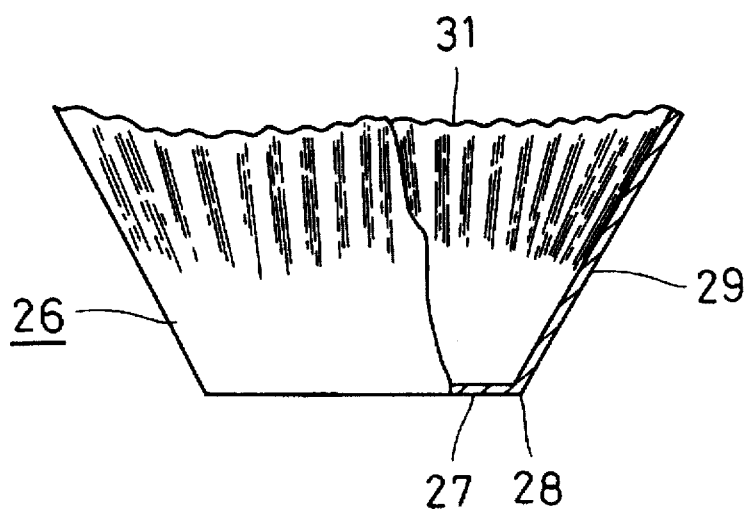
FIG. 4 is a partly sectionned side view showing another prior art pan.

Referring to the drawings and FIG. 1 as well as FIG. 2, 10 is a disposable pan according to the present invention, which is made from a paper sheet material by press means. As the paper material a rigid one (for example 240 g/m2) is used to get certain elongated or square cuts, then is preferably laminated by a synthetic resin and/or preferably impregnated with a surface active agent or a size agent. It is also natural to select any paper material resistant to the fire flame of about 800 Centigrade that solid or liquid fuel provides. The paper material may be one having two paper layers and a polyethylene layer sandwiched therebetween.

12 is a bowl-like concave part including a bottom portion. 14 is a flange part extended outwards from the upper peripheral edge of the concave part 12. 12w is a peripheral side wall of the concave part 12. An opening divergent part 16 is extended from the outer peripheral folding edge of the flange part 14.

According to the shown embodiment, a plurality of wrinkles 18 are formed between the peripheral wall 12w and flange part 14, so that plural folds 16p can be formed on the opening divergent part 16 having the overlapped width small. Since the overlapped width is small, the overlapped leaf pieces cannot be folded then unfolded and it becomes difficult to deform the paper configuration, thus its press formation can be maintained.

Figure 9:
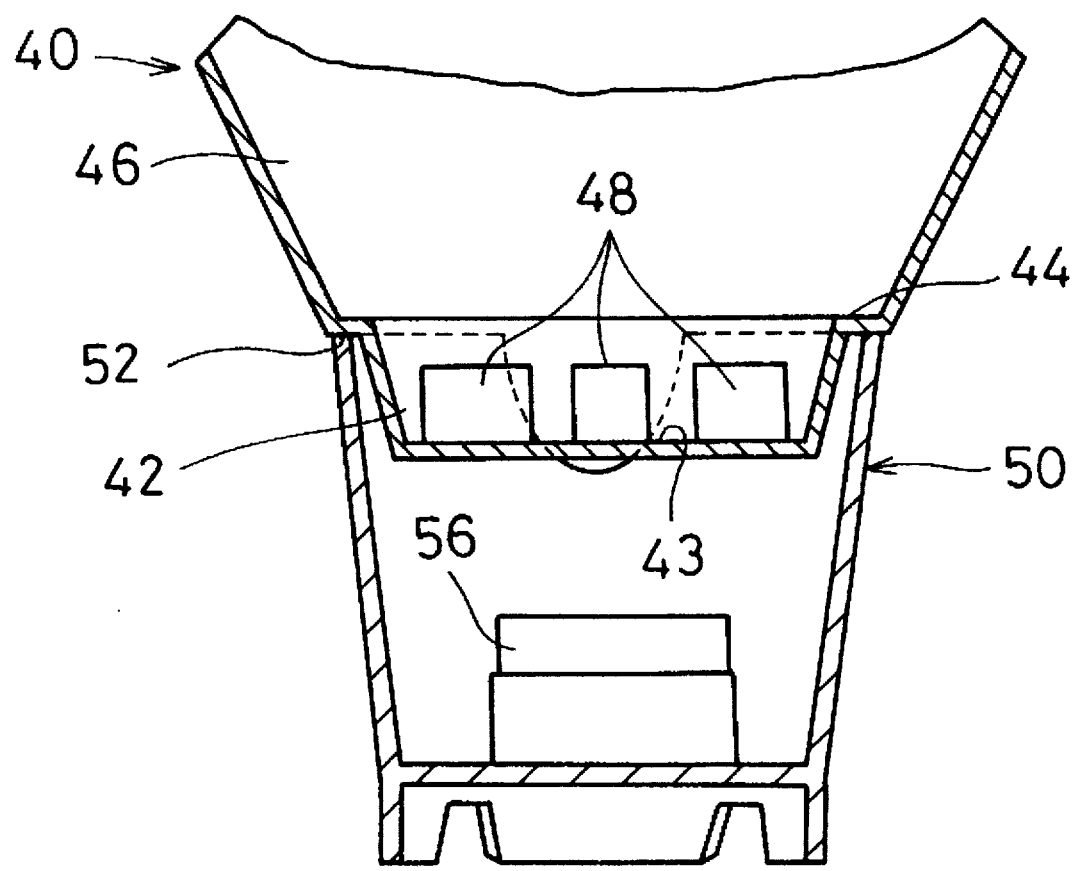
FIG. 9 is a section view showing a prior art bottom portion.
Figure 10:
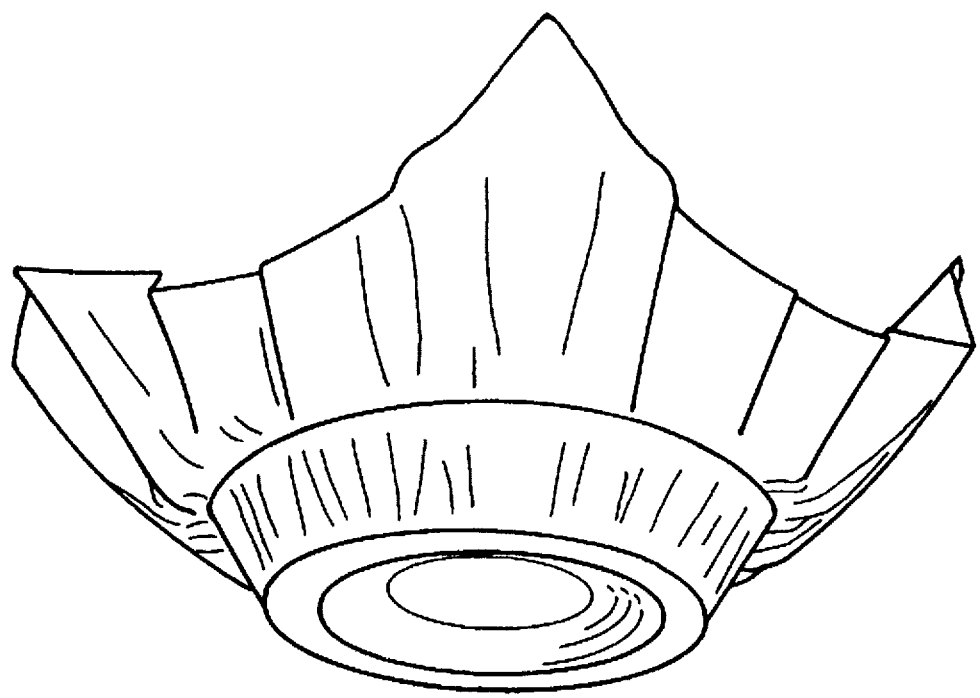
FIG. 10 is a perspective view of an embodiment of the present invention with a dome-shaped bottom portion.

Referring to FIG. 9, it is to be noted that a bottom portion 43 of prior art disposable pan 40 has the inner surface plane. 48 is a cut piece of bean curd representative of cooking materials. When the cut piece 48 is touched directly on the bottom inner surface, thereby not to interpose any water, soup or the like therebetween, it becomes easy to get burning of the so-touched bottom surface by fire from a solid fuel 56.

Figure 6:
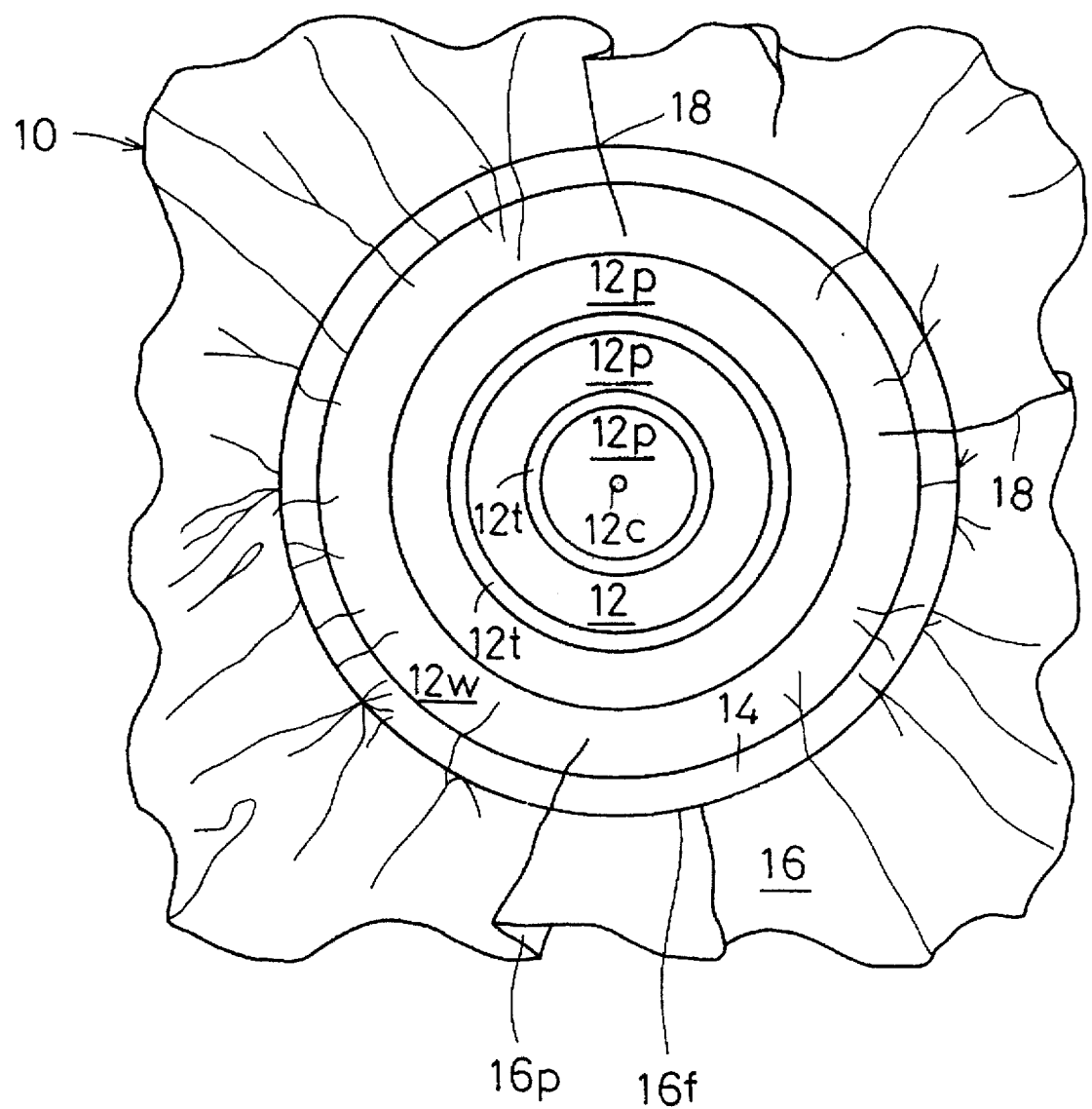
FIG. 6 is a top view showing still another embodiment of the present invention.
Figure 7:
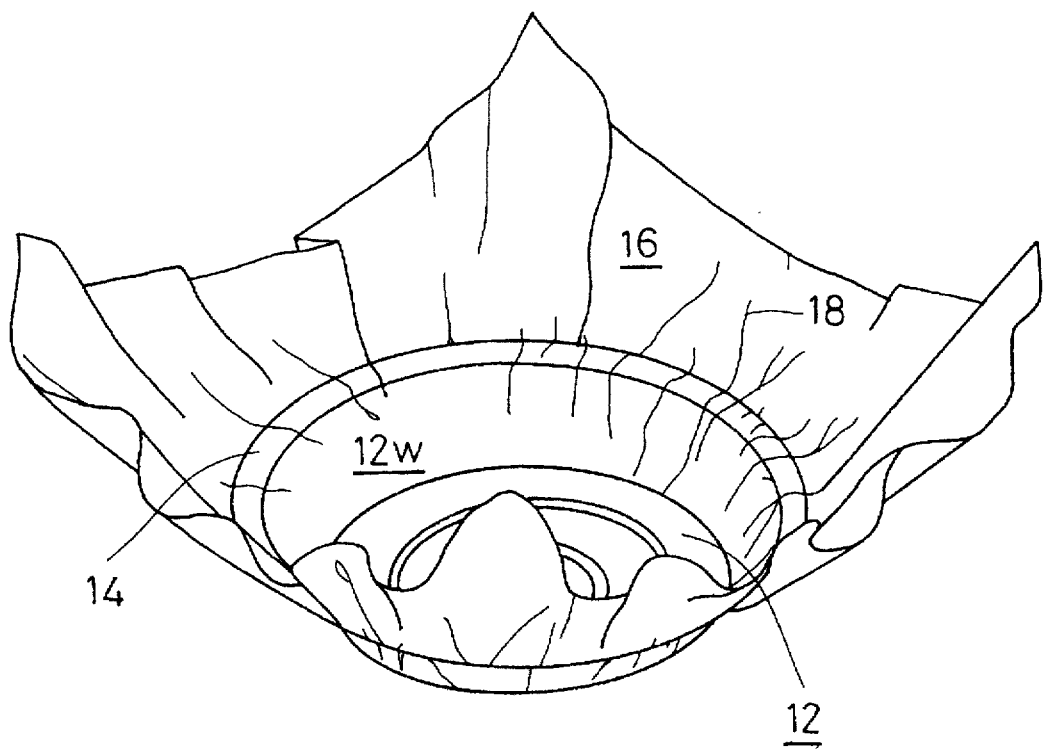
FIG. 7 is a perspective view of another embodiment of the present invention.
Figure 8:
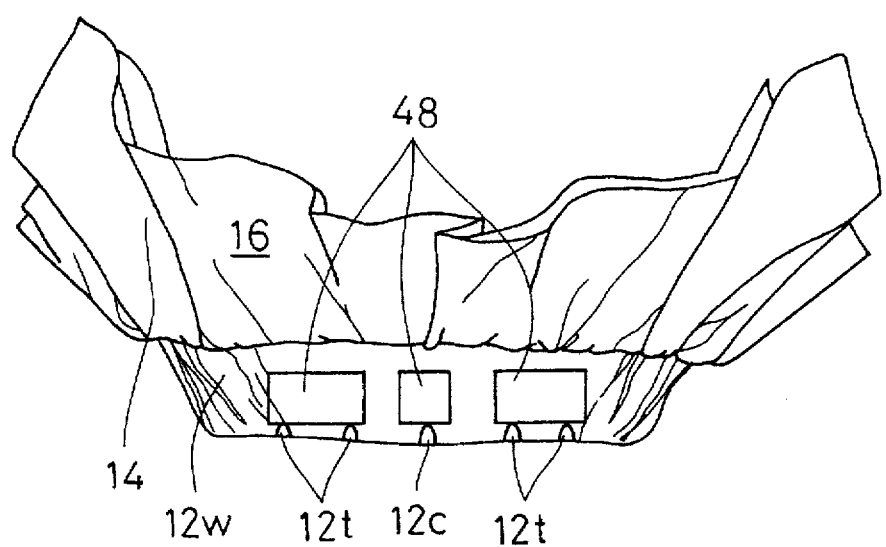
FIG. 8 is a side view showing the interior bottom portion of the embodiment of FIG. 7.

According to the embodiment as shown in FIG. 6, the bottom inner surface is formed to have flat portions 12p and projections 12c, 12t spaced from each other, of which 12c is a point projection and 12t is a co-centric ring projection. As illustrated in FIG. 8, the cut pieces 48 of bean curd are placed on the so formed bottom surface, rising a little from the lower flat portion, and allowing to interpose water, soup or the like around projections 12c, 12t, thereby to prevent the bottom portion from easily burning or scorching. The bottom inner surface may also be formed in a dome to elevate said surface, thereby preventing said surface from easily burning.

Various embodiments other than as aforesaid are provided by combining two different types of disposable pans (type A composed of three parts and type B composed of two parts) with one or more means optionally selected from the two means groups, one group of deforming preventive means consisting of the folds device as exemplified in FIG. 1 (called "W. folds") and lamination of synthetic resin, profitably polyethylene to the paper sheet material (called "Laminar"), and the another group of burning preventive means consisting of projections provided on the bottom inner surface (called "B.inner"), lamination of metallic foil sheet, profitably aluminum foil sheet applied to the bottom outer back surface (called "B.back") and impregnation of a surface active agent (called "Agent").

Figure 5:
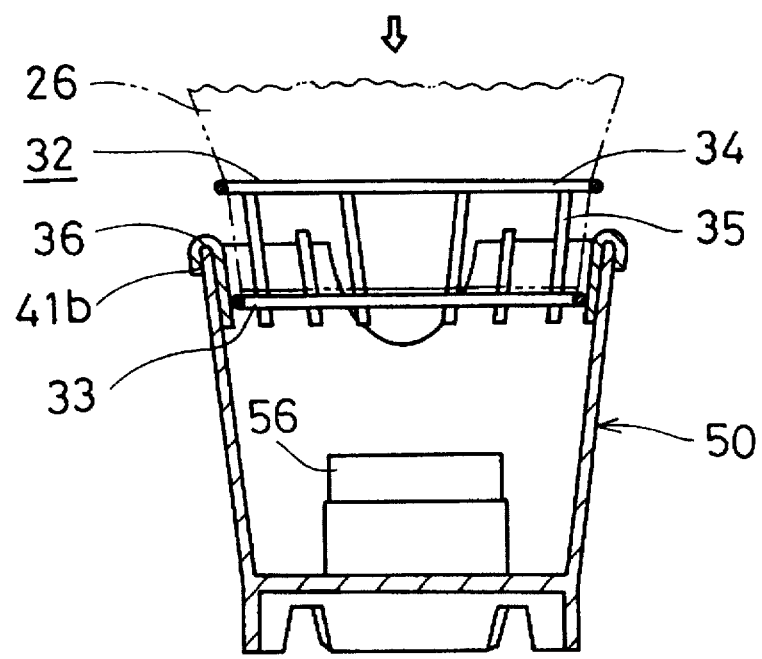
FIG. 5 is an explanatory view showing a working mode of said another prior art pan.

These embodiments are itemized in the followng tables 1, 2, wherein "Burng." denotes a burning resisting score and "Deforg." denotes a deforming resisting score, the former being evaluated by comparison with both a perfect mark of 5 and a normal score of 3 prior art ones provide, and the latter being evaluated by comparison with both a perfect mark of 4 and a normal score of 2 prior art ones provide. A burning resisting test is carried out by providing 4 pieces of bean curd 3 cm cubic pieces and water of 300 milli-liter, leaving to stand for 5 minutes, and boiling them by 25 g of solid fuel. A deforming resisting test is carried out by providing 2 pieces of bean curd 3 cm cubic cuts and water of 300 milli-liter, leaving to stand for 2 hours, boiling them with 25 g of solid fuel, and leaving to stand for 1 hour. Besides, "Y" denotes "relevant means is applied" and "N" denotes "not applied", further "strip" denotes stripping of polyethelene only on the bottom inner surface in order to prevent said surface from easily burning. The type B ones were tested under the working mode shown in FIG. 5.

TABLE 1

| Item | Type | W. folds | B. inner | Laminar | B. back | Agent | Burng. | Deforg. |
|---|---|---|---|---|---|---|---|---|
| 1 | A | Y | N | N | N | N | 3 | 2.2 |
| 2 | A | Y | N | N | N | Y | 4 | 2.1 |
| 3 | A | Y | N | N | Y | N | 4.5 | 2.2 |
| 4 | A | Y | N | Y | N | N | 2.5 | 4 |
| 5 | A | Y | N | Y | N | Y | 3.5 | 3.9 |
| 6 | A | Y | N | Y | Y | N | 4 | 4 |
| 7 | A | Y | N | Y | Y | Y | 5 | 3.9 |
| 8 | A | Y | N | strip | N | N | 3 | 4 |
| 9 | A | Y | N | strip | N | Y | 4 | 3.9 |
| 10 | A | Y | dome | N | N | N | 4 | 2.2 |
| 11 | A | Y | dome | N | Y | N | 5 | 2.2 |
| 12 | A | Y | dome | N | N | Y | 5 | 2.1 |
| 13 | A | Y | dome | Y | N | N | 3.5 | 4 |
| 14 | A | Y | dome | Y | N | Y | 4.5 | 3.9 |
| 15 | A | Y | dome | strip | N | N | 4 | 4 |
| 16 | A | Y | dome | strip | N | Y | 5 | 3.9 |
| 17 | A | Y | ring | N | N | N | 3.5 | 2.2 |
| 18 | A | N | N | N | N | Y | 4 | 2 |
| 19 | A | N | N | N | Y | N | 4.5 | 2 |
| 20 | A | N | N | Y | N | N | 2.5 | 3.8 |
| 21 | A | N | N | Y | N | Y | 3.5 | 3.7 |
| 22 | A | N | N | Y | Y | N | 4 | 3.8 |
| 23 | A | N | N | strip | N | N | 3 | 3.8 |
| 24 | A | N | dome | N | N | N | 4 | 2 |
| 25 | A | N | dome | N | N | Y | 5 | 2 |
| 26 | A | N | dome | N | Y | N | 5 | 2 |
| 27 | A | N | dome | Y | N | N | 3.5 | 3.8 |
| 28 | A | N | dome | Y | N | Y | 4.5 | 3.7 |
| 29 | A | N | dome | strip | N | N | 4 | 3.8 |
| 30 | A | N | ring | N | N | N | 3.5 | 2 |
| 31 | B | N | ring | N | N | N | 3.5 | |
| 32 | B | N | dome | N | N | N | 4 | |
| 33 | B | N | dome | Y | N | N | 3.5 | |
| 34 | B | N | dome | strip | N | N | 4 | |
| 35 | B | N | dome | N | Y | N | 5 | |
| 36 | B | N | dome | Y | N | Y | 4.5 | |
| 37 | B | N | N | strip | N | N | 3 | |
| 38 | B | N | N | strip | Y | N | 4.5 | |

TABLE 1-continued

| Item | Type | W. folds | B. inner | Laminar | B. back | Agent | Bumg. | Deforg. |
|------|------|----------|----------|---------|---------|-------|-------|---------|
| 39 | B | N | N | strip | N | Y | 4 | |
| 40 | B | N | N | Y | Y | N | 4 | |
| 41 | B | N | N | Y | N | Y | 3.5 | |
| 42 | B | N | N | N | N | N | 3 | |
| 43 | B | N | N | Y | N | N | 2.5 | |

TABLE 2

| Item | Type | W. folds | B. inner | Laminar | B. back | Agent | Bumg. | Deforg. |
|------|------|----------|----------|---------|---------|-------|-------|---------|
| 1 | A | Y | ring | Y | N | N | 3 | 4 |
| 2 | A | Y | proj. | Y | N | N | 3 | 4 |
| 3 | A | Y | N | Y | Y | N | 4 | 4 |
| 4 | A | Y | N | strip | N | N | 3 | 4 |
| 5 | A | Y | N | Y | N | *1 | 3.5 | 3.9 |
| 6 | A | Y | N | Y | N | *2 | 2.8 | 4 |
| 7 | A | Y | N | Y | N | *3 | 3 | 4 |
| 8 | A | Y | N | Y | N | *4 | 5 | 3 |
| 9 | A | Y | N | Y | N | *5 | 5 | 2.5 |
| 10 | A | Y | N | Y | N | *6 | 3.5 | 3.9 |
| 11 | A | Y | N | Y | N | *7 | 3.5 | 3.9 |
| 12 | A | Y | N | Y | N | *8 | 3.5 | 3.9 |
| 13 | A | Y | N | Y | N | *9 | 3.2 | 3.9 |
| 14 | A | Y | N | Y | N | *10 | 3.2 | 3.9 |
| 15 | A | Y | N | Y | N | *11 | 3.2 | 3.9 |
| 16 | A | Y | N | Y | N | *12 | 3.2 | 3.9 |
| 17 | A | Y | N | Y | N | *13 | 3.2 | 3.9 |
| 18 | A | Y | N | Y | N | *14 | 3.2 | 3.9 |
| 19 | A | Y | N | Y | N | *15 | 3.5 | 3.9 |

Note:
*1 2 g/m2 of sucrose stearic acid ester used,
*2 0.1 g/m2 of sucrose stearic acid ester used,
*3 0.5 g/m2 of sucrose stearic acid ester used,
*4 4 g/m2 of sucrose stearic acid ester used,
*5 10 g/m2 of sucrose stearic acid ester used,
*6 2 g/m2 of sucrose palmitic acid ester used,
*7 2 g/m2 of sucrose oleic acid ester used,
*8 2 g/m2 of sucrose lauric acid ester used,
*9 2 g/m2 of decaglycerin monostearic acid ester used,
*10 2 g/m2 of hexaglycerin monostearic acid ester used,
*11 2 g/m2 of tetraglycerin monostearic acid ester used,
*12 2 g/m2 of decaglycerin monooleic acid ester used,
*13 2 g/m2 of decaglycerin monolauric acid ester used,
*14 2 g/m2 of decaglycerin monocaprylic acid ester used,
*15 0.34 g of sucrose stearic acid ester are coated on the bottom inner surface.

When bubbles exist on the bottom inner surface, it is easy to get burning to the bottom portion. For this, surface active agent is used to float such bubbles.

We claim:

1. A disposable pan made from paper sheet material by press means, comprising:

a bowl-shaped concave part, including a side wall, a bottom portion, an upper peripheral edge, a flange part extending outwards from the upper peripheral edge of said concave part and ending in an outer peripheral folding edge, an opening divergent part extending upwards from the outer peripheral folding edge of said flange part, a plurality of wrinkles formed on the side wall of said concave part and extending to said flange part acting to prevent deformation of the concave part, and a plurality of folds, having a small overlapped width, formed by said wrinkles and provided on said opening divergent part.

2. A disposable pan made from paper sheet material by press means, comprising:

a bowl-shaped concave part, including a side part, a bottom portion, an upper peripheral edge, a flange part extending outwards from the upper peripheral edge of said concave part and ending in an outer peripheral folding edge;

an opening divergent part extending upwards from the outer peripheral folding edge of said flange part;

a plurality of wrinkles formed between the side wall of said concave part and said flange part acting to prevent deformation of the concave part; and a plurality of folds, having a small overlapped width, formed by said wrinkles and provided on said opening divergent part;

wherein said paper sheet material comprises a fatty acid ester surface active agent.

3. A disposable pan according to claim 2, wherein said surface active agent is a sucrose fatty acid ester.

4. A disposable pan according to claim 3 wherein said sucrose fatty acid ester has a carbon number of 8 to 22.

5. A disposable pan according to claim 4, wherein the sucrose fatty acid ester has a carbon number of 16 to 18.

6. A disposable pan according to claim 3, wherein the sucrose fatty acid ester is sucrose stearic acid ester.

7. A disposable pan according to claim 3, wherein the sucrose fatty acid ester is sucrose palmitic acid ester.

8. A disposable pan according to claim 3, wherein the sucrose fatty acid ester is sucrose oleic acid ester.

9. A disposable pan according to claim 3, wherein the sucrose fatty acid ester is sucrose lauric acid ester.

10. A disposable pan according to claim 2, wherein the surface active agent is decaglycerin monostearic acid ester.

11. A disposable pan according to claim 2, wherein the surface active agent is hexaglycerin monostearic acid ester.

12. A disposable pan according to claim 2, wherein the surface active agent is tetraglycerin monostearic acid ester.

13. A disposable pan according to claim 2, wherein the surface active agent is decaglycerin monooleic acid ester.

14. A disposable pan according to claim 2, wherein the surface active agent is decaglycerin monolauric acid ester.

15. A disposable pan according to claim 2, wherein the surface active agent is decaglycerin monocaprylic acid ester.

16. A disposable pan made from paper sheet material by press means, comprising:
- a bowl-shaped concave part, including a side part, a bottom portion having a dome shape to elevate a surface of the bottom portion, an upper peripheral edge, a flange part extending outwards from the upper peripheral edge of said concave part and ending in an outer peripheral folding edge;
- an opening divergent part extending upwards from the outer peripheral folding edge of said flange part;
- a plurality of wrinkles formed between the side wall of said concave part and said flange part acting to prevent deformation of the concave part; and
- a plurality of folds having a small overlapped width formed by said wrinkles and provided on said opening divergent part.

17. A disposable pan according to claim 16, wherein said paper sheet material comprises a fatty acid ester surface active agent.

18. A disposable pan according to claim 17, wherein said surface active agent is a sucrose fatty acid ester.

19. A disposable pan according to claim 18, wherein said sucrose fatty acid ester has a carbon number of 8 to 22.

20. A disposable pan according to claim 19, wherein the sucrose fatty acid ester has a carbon number of 16 to 18.

21. A disposable pan according to claim 18, wherein the sucrose fatty acid ester is sucrose stearic acid ester.

22. A disposable pan according to claim 18, wherein the sucrose fatty acid ester is sucrose palmitic acid ester.

23. A disposable pan according to claim 18, wherein the sucrose fatty acid ester is sucrose oleic acid ester.

24. A disposable pan according to claim 18, wherein the sucrose fatty acid ester is sucrose lauric acid ester.

25. A disposable pan according to claim 17, wherein the surface active agent is decaglycerin monostearic acid ester.

26. A disposable pan according to claim 17, wherein the surface active agent is hexaglycerin monostearic acid ester.

27. A disposable pan according to claim 17, wherein the surface active agent is tetraglycerin monostearic acid ester.

28. A disposable pan according to claim 17, wherein the surface active agent is decaglycerin monooleic acid ester.

29. A disposable pan according to claim 17, wherein the surface active agent is decaglycerin monolauric acid ester.

30. A disposable pan according to claim 17, wherein the surface active agent is decaglycerin monocaprylic acid ester.

* * * * *